United States Patent [19]

Moser et al.

[11] 3,818,032

[45] June 18, 1974

[54] SUBSTITUTED 1-PHENYL-2,5-DIOXO IMIDAZOLIDINES

[75] Inventors: Hans Moser, Basel; Christian Vogel, Binningen, both of Switzerland

[73] Assignee: Ciba-Geigg Corporation, Ardsley, N.Y.

[22] Filed: Mar. 9, 1972

[21] Appl. No.: 233,275

[30] Foreign Application Priority Data
Mar. 16, 1971 Switzerland.......................... 3856/71

[52] U.S. Cl.............. 260/309.5, 71/92, 260/553 A, 260/465 D
[51] Int. Cl............................................ C07d 49/32
[58] Field of Search................................. 260/309.5

[56] References Cited
OTHER PUBLICATIONS

Dakin, J. Chem. Soc., (1915) 107, 434–439.
Wagner et al., Synthetic Organic Chemistry, (1953) page 92.
C. A. 75:140,853d (Sept. 9, 1971) Baskakov et al.

*Primary Examiner*—John D. Randolph
*Assistant Examiner*—S. D. Winters
*Attorney, Agent, or Firm*—Frederick H. Rabin; Harry Falber

[57] ABSTRACT

Substituted 1-phenyl-2,5-dioxo-imidazolidines are effective weed-killers in crop plant cultures. They may be used in the form of herbicidal agents.

20 Claims, No Drawings

SUBSTITUTED 1-PHENYL-2,5-DIOXO IMIDAZOLIDINES

The present invention relates to substituted 1-phenylimidazolidin-2,5-diones, a process for their manufacture, also to herbicidal agents which contain these new compounds as active substances and to a method for selectively combating weeds, which comprises the use of the new active substances and of agents which contain them.

The substituted 1-phenyl-2,5-dioxo-imidazolidines correspond to the formula 1 and comprise possible mineral acid salts, including also those which are formed by quaternisation of a substituted amino group.

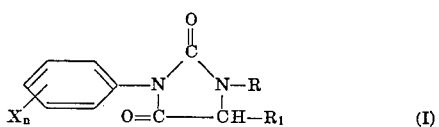

In this formula, X represents a halogen atom, the cyano group, a lower alkyl or alkoxy radical, a lower alkenyloxy, alkinyloxy or alkenylthio radical, the phenoxy radical, the trifluoromethyl group, an optionally chlorinated methylsulphonyl radical or a dialkylsulphamoyl radical, $n$ represents 0 or an integer from 1 to 3, R represents a lower alkyl or alkoxy radical, $R_1$ represents halogen, the cyano group, the group —NCS, the amino group, an alkylamino, alkenylamino, dialkylamino, cyanoalkylamino or guanidyl group, also a urea radical of the formula

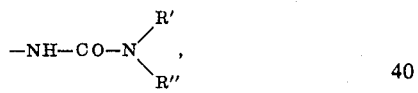

wherein R' and R'' each represents hydrogen, alkyl, aryl or alkoxy, $R_1$ also represents a radical -OR''', in which R''' represents hydrogen, the cyano group, a cyanoalkyl radical or the group —COZ, in which Z stands for alkylamino, dialkylamino, alkyl, halogenoalkyl, phenyl, alkoxy or alkylthio, and finally, $R_1$ also represents a group of the formula

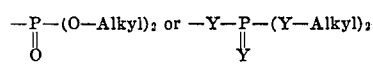

in which each Y independently represents oxygen or sulphur and the alkyl radicals may also be halogenated.

By halogen atoms represented by the radicals X and $R_1$ are meant fluorine, chlorine, bromine and iodine. In this connection, chlorine is the preferred halogen atom for $R_1$.

By alkyl radicals which may occur alone or bonded to O, N or S, are meant those containing at most 6, but preferably one to three carbon atoms. These alkyl radicals may be straight-chain or branched.

Alkenyl and alkinyl radicals contain preferably three carbon atoms.

Among the active substances defined according to formula I, particular mention is to be made of those wherein X represents a fluorine, chlorine, bromine or iodine atom, the cyano group, an alkyl or alkoxy radical each containing from one to three carbon atoms, the trifluoromethyl radical, a methylsulphonyl or dimethylsulphamoyl radical, $n$ is 0 or an integer from 1 to 3, R represents the methyl group, and $R_1$ represents a chlorine atom, the hydroxyl group, the amino group, or a dialkylamino, alkylcarbamoyloxy or dialkylcarbamoyloxy group containing at most three carbon atoms in the respective alkyl radical, or an optionally chlorinated, saturated aliphatic acyl radical or an O,O-bis(alkyl)dithiophosphoryl group containing in each case at most 4 carbon atoms in the aliphatic chain.

Of the cited compounds, particular importance attaches to those in which X represents a fluorine, chlorine, bromine or iodine atom, the cyano group, the methyl, methoxy, trifluoromethyl, methylsulphonyl or dimethylsulphamoyl radical.

Among these compounds, those having particularly satisfactory action are to be singled out in which $n$ is 0 or an integer from 1 to 3, R represents the methyl group, and $R_1$ represents a chlorine atom, the hydroxyl group, the amino group or a dialkylamino group containing at most 3 carbon atoms in the alkyl radical, the methylcarbamoyloxy, dimethylcarbamoyloxy, acetyl, chloroacetyl or an O,O-bis(alkyl)dithiophosphoryl group, in which each of the two alkyl radicals independently represents methyl, ethyl, propyl or isopropyl.

Phenyl-imidazolidine-diones in which $R_1$ represents the hydroxyl group are particularly valuable compounds.

The new 1-phenyl-2,5-dioxo-imidazolidines of the formula I are obtained according to the invention by reacting a substituted phenylurea of the formula II

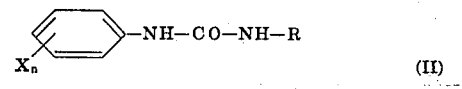

in which X, n and R have the meanings given under formula I, with glyoxylic acid in an organic solvent, and, if desired, substituting the hydroxyl group in 4-position in the resulting substituted 1-phenyl-4-hydroxy-2,5-dioxo-imidazolidine of the formula

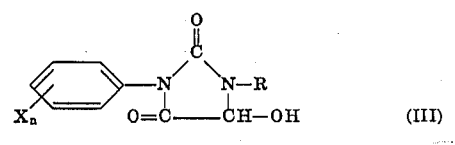

by another of the radicals defined under $R_1$.

a. The substitution of the hydroxyl group by a halogen atom is performed most advantageously by reacting (III) with a thionyl halide ($SOHal_2$).

b. The so obtained 4-halogeno-2,5-dioxo-imidazolidine is suitable for reacting with reactive compounds of the type $HR_1$ or $MeR_1$ (Me = alkali metal), in order to introduce other organic radicals which correspond to the definition given for $R_1$.

To introduce dialkylphosphoryl groups —PO-(O—alkyl)$_2$, the corresponding 4-halogeno-2,5-dioxo-imidazolidine is reacted with a trialkyl phosphite.

c. The substitution of the hydroxyl group in the compound (III) by a group —O—CO—NH—alkyl may be carried out advantageously by reacting the compound (III) with an alkylisocyanate in the presence of a condensation catalyst, for example pyridine, triethylamine etc.

d. To substitute the hydroxyl group by a group

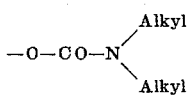

the compound (III) is reacted advantageously with a dialkylcarbamic halide in the presence of tertiary amines, for example pyridine or triethylamine.

e. To substitute the hydroxyl group by a group halogenoalkylCO-O-, the compound (III) is reacted with a halogeno-fatty acid halide or with a halogeno-fatty acid anhydride, preferably in the presence of tertiary amines.

f. Finally, the substitution of the hydroxyl group by a group -O-CO-S-alkyl is effected to reacting the compound of the formula III with a chlorocarbonic thioalkyl ester in the presence of tertiary amines.

All the reactions cited under (b) to (f) are carried out in the presence of an organic solvent or diluent and in the presence of an acid binding agent or a basic condensation agent.

Suitable solvents or diluents for all the reactions cited hereinabove are aliphatic and aromatic hydrocarbons and halogenated hydrocarbons, for example benzene, toluene, chloroform, methylene chloride, ketones, in particular acetone, ether and ether-like compounds, such as dioxan, also esters, nitriles, N,N-dialkylated amides, pyridine etc., as well as mixtures of these solvents with one another.

As acid binding agents and also as condensation agents, it is possible to use, inter alia, tertiary amines, for example trialkylamines, also pyridine and pyridine bases; and as catalyst for the reaction according to (b), dimethyl formamide may also be used.

The reaction temperatures for the cited reactions are in the range from 0°C to 150°C.

The 1-phenyl-2,4-dioxo-5-hydroxy-imidazolidines which are formed in slight amounts as by-products in the first reaction step can be easily isolated by recrystallising the desired compounds of the formula III.

The following Examples illustrate the manufacture of the new substituted 1-phenyl-2,5-dioxo-imidazolidines of the formula I. Further active substances of this formula which have been manufactured according to the methods described in the Examples and cited hereinbefore, are listed in the Table following the Examples.

EXAMPLE 1

1-phenyl-3-methyl-4-hydroxy-2,5-dioxo-imidazolidine

75 Grams of N-phenyl-N'-methylurea and 56 g of glyoxylic acid monohydrate (97 percent) are suspended in 600 ml of chloroform and this suspension is boiled under reflux for 3 hours with stirring and using a water separator. Upon expiry of this time, 19 ml of water have been deposited in the water separator. The bath is cooled to room temperature, the crude product then filtered off, washed with chloroform and recrystallised from ethyl acetate, to yield 67 g of 1-phenyl-3-methyl-4-hydroxy-2,5-dioxo-imidazolidine (m.p. 183°-185°C).

EXAMPLE 2

1-phenyl-3-methyl-4-chloro-2,5-dioxo-imidazolidine 63.8 Grams of 1-phenyl-3-methyl-4-hydroxy-2,5-dioxo-imidazolidine, 24 ml of thionyl chloride and 2.1 ml of dimethyl formamide are heated in 600 ml of benzene until the evolution of HCl ceases. A pale yellow solution gradually forms during this time (approx. 2 ½ hours). This solution is filtered hot over glass wool and upon cooling, the product precipitates in the form of white crystals. The precipitate is filterd, washed with benzene and the filter product recrystallised from ethyl acetate, to yield 29.5 g of 1-phenyl-3-methyl-4-chloro-2,5-dioxo-imidazolidine (m.p. 137-140°C).

EXAMPLE 3

1-phenyl-3-methyl-4-dimethylphosphoryl-2,5-dioxo-imidazolidine 22.4 Grams of 1-phenyl-3-methyl-4-chloro-2,5-dioxoimidazolidine and 13 ml of trimethyl phosphite are heated under reflux for 15 hours with 200 ml of benzene. Upon expiry of this time, the evolution of methyl chloride has ceased. The reaction mixture is evaporated in vacuo and the crystalline residue is recrystallised from ethyl acetate, to give 19.4 g of 1-phenyl-3-methyl-4-dimethylphosphoryl-2,5-dioxo-imidazolidine, which melts in the range of 124°C and 126°C.

EXAMPLE 4

1-phenyl-3-methyl-4-(methylcarbamoyloxy)-2,5-dioxo-imidazolidine 20.6 Grams of the hydroxy compound obtained according to Example 1, 9.1 ml of methylisocyanate and 1.4 ml of triethylamine are stirred in 200 ml of dioxane for 20 hours at room temperature. The clear solution is evaporated in vacuo to leave as residue a yellow oil which becomes crystalline on scratching. After recrystallisation twice from ethyl acetate, the 1-phenyl-3-methyl-4-(-methylcarbamoyloxy)-2,5-dioxo-imidazolidine melts at 124°-126°C.

EXAMPLE 5

1-phenyl-3-methyl-4-(dimethylcarbamoyloxy)-2,5-dioxo-imidazolidine 10.6 Grams of the hydroxy compound according to Example 1, 5.1 ml of dimethyl carbamoylchloride and 100 ml of pyridine are left to stand for 50 hours at room temperature. The reaction mixture is evaporated in vacuo, the residue treated with water and crystallised by scratching. The crystals are filtered off, washed with water and the crude product dried over $P_2O_5$. Recrystallisation from ethyl acetate yields 5.9 g of 1-phenyl-3-methyl-4-(dimethylcarbamoyloxy)-2,5-dioxo-imidazolidine (m.p. 136°-139°C).

EXAMPLE 6

1-phenyl-3-methyl-4-chloroacetoxy-2,5-dioxo-imidazolidine 20.6 Grams of the hydroxy compound according to Example 1 and 18.7 g of chloroacetic anhydride are heated for 6 hours in 200 ml of dioxan at 100°C bath temperature. After the reaction mixture has cooled, the product separates out in the form of a white precipitate. It is filtered, washed with dioxan and recrystallised from methanol, to give 16.3 g of 1-phenyl-3-methyl-4- chloroacetoxy-2,5-dioxoimidazolidine (m.p. 137°–139°C).

EXAMPLE 7

1-phenyl-3-methyl-4-(0-ethylthio-carbonyl)-oxy-2,5-dioxo-imidazolidine 20.6 Grams of 1-phenyl-3-methyl-4-hydroxy-2,5-dioxoimidazolidine and 11.5 of chloroethyl-S-formate are suspended in 200 ml of dioxan and this suspension is warmed to 40°C. Triethylamine (15.4 ml) is then added dropwise at this temperature. The batch is stirred overnight at room temperature, the precipitated trimethylamine hydrochloride is filtered off and the filtrate concentrated in vacuo. The residue is recrystallised twice from diisopropyl ether, to give 14.5 g 1-phenyl-3-methyl-4-(0-ethylthio-carbonyl)-oxy-2,5-dioxo-imidazolidine (m.p. 86°–88°C).

EXAMPLE 8

1-(3′,4′-dichlorophenyl)-3-methyl-4-(S-dimethoxy-phosphinothioyl)thio-2,5-dioxo-imidazolidine 29.4 Grams of 1-(3′,4′-dichlorophenyl)-3-methyl-4-chloro-2,5-dioxo-imidazolidine are dissolved in 250 ml of absolute acetone. While stirring, 21.6 g of potassium dimethyldithiophosphate are added in small amounts. The batch is stirred overnight, the precipitated potassium chloride filtered off and the filtrate concentrated in vacuo. The yellow residual oil is dissolved in diisopropyl ether, treated with animal charcoal and evaporated once more. The residue is dried to yield 23 g of 1-(3′,4′-dichlorophenyl)-3-methyl-4-(S-dimethoxyphosphinothioyl)-thio-2,5-dioxo-imidazolidine in the form of a pale yellow oil.

| $C_{12}H_{13}Cl_2N_2O_4PS_2$ (mol.w. 415.3) | | calculated | found |
|---|---|---|---|
| | C | 34.71 | 34.97 |
| | H | 3.15 | 3.38 |
| | Cl | 17.07 | 16.90 |
| | N | 6.75 | 6.76 |
| | O | 15.44 | 15.63 |

The following Table lists the active substances of the formula I described in the Examples and further such substances which are manufactured according to the processes of the above cited Examples, namely those of the narrower formula

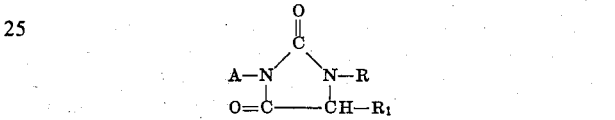

| No. | A | R | $R_1$ | Melting point, degrees |
|---|---|---|---|---|
| 1 | phenyl | CH₃ | OH | 183–185 |
| 2 | 3-CH₃O-4-Cl-phenyl | CH₃ | OH | 168–170 |
| 3 | 3-CH₃-4-Cl-phenyl | CH₃ | OH | 187–190 |
| 4 | 4-Br-3-CH₃-phenyl | CH₃ | OH | 189–191 |
| 5 | 4-Cl-phenyl | CH₃ | OH | 192–195 |
| 6 | 4-Br-phenyl | OH₃ | OH | 203–205 |
| 7 | 3,4-diCl-phenyl | OH₃ | OH | 195–198 |
| 8 | 3-Br-phenyl | CH₃ | OH | 140–142 |
| 9 | 3-CF₃-phenyl | CH₃ | OH | 142–145 |
| 10 | 3-CH₃-phenyl | CH₃ | OH | 132–135 |

| No. | A | R | R₁ | Melting point, degrees |
|---|---|---|---|---|
| 11 | 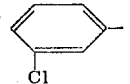 Cl | CH₃ | OH | 152-155 |
| 12 | 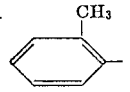 CH₃ | CH₃ | OH | 151-153 |
| 13 | CH₃—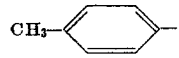 | CH₃ | OH | 180-183 |
| 14 | CH₃—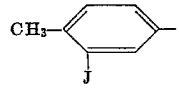—J | CH₃ | OH | 178-182 |
| 15 | 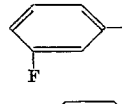 F | CH₃ | OH | 158-160 |
| 16 | F—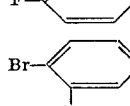 | CH₃ | OH | 149-151 |
| 17 | Br—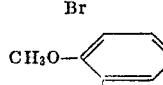—Br | CH₃ | OH | 200-202 |
| 18 | CH₃O—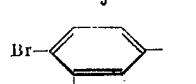—J | CH₃ | OH | 173-174 |
| 19 | Br—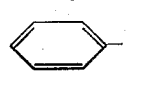—J | CH₃ | OH | 209-211 |
| 20 | 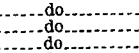 | CH₃ | Cl | 137-140 |
| 21 | Same as above | CH₃ | —PO(OCH₃)₂ | 124-26 |
| 22 | do | CH₃ | —O—CO—NHCH₃ | 124-12 |
| 23 | do | CH₃ | —O—CO—N(CH₃)₂ | 136-139 |
| 24 | do | CH₃ | —O—CO—CH₂Cl | 135-137 |
| 25 | do | CH₃ | —O—CO—S—C₂H₅ | 86-88 |
| 26 | Cl—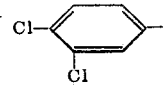—Cl | CH₃ | —O—CO—NHCH₃ | 140-142 |
| 27 | Same as above | CH₃ | —O—CO—N(CH₃)₂ | 160-162 |
| 28 | do | CH₃ | —O—CO—CH₂Cl | 96-98 |

PAT. No. 3818032— Folio 405

| No. | A | R | R₁ | Melting point, degrees |
|---|---|---|---|---|
| 29 | Cl—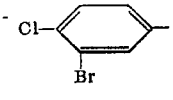—Br | CH₃ | OH | 188-191 |
| 30 | Cl—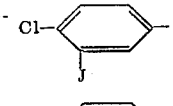—J | CH₃ | OH | 195-203 |
| 31 | Br—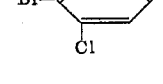—Cl | CH₃ | OH | 206-209 |
| 32 | Br—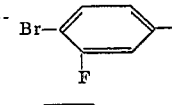—F | CH₃ | OH | 202-205 |
| 33 | 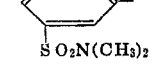 SO₂N(CH₃)₂ | CH₃ | OH | 122-131 |

| No. | A | R | R₁ | Melting point, degrees |
|---|---|---|---|---|
| 34 | (CH₃)₂N—O₂S—C₆H₄— | CH₃ | OH | 196–199 |
| 35 | 3,4-Cl₂—C₆H₃— | CH₃ | Cl | 160–162 |
| 36 | Same as above | CH₃ | —PO(OCH₃)₂ | 122–124 |
| 37 | do | CH₃ | —S—PS(OCH₃)₂ | Oil |
| 38 | do | CH₃ | —O—CH₂CN | ---------- |
| 39 | do | CH₃ | —NH—CH₂—CN | 105–107 |
| 40 | do | CH₃ | —OCN | 217–220 |
| 41 | do | CH₃ | —NCS | 80–82 |
| 42 | do | CH₃ | —CN | ---------- |
| 43 | do | CH₃ | —NH—C(=NH)—NH₂ | ---------- |
| 44 | do | CH₃ | NH₂ | 170–172 |
| 45 | do | CH₃ | —N(CH₃)₂ | 136–138 |
| 46 | do | CH₃ | —NH—CO—N(CH₃)₂ | ---------- |
| 47 | do | CH₃ | —NH—CO—NH—C₆H₄—Cl | 215–217 |
| 48 | 2,5-Cl₂—C₆H₃— | CH₃ | OH | 154–156 |
| 49 | CH₃SO₂—C₆H₄— | CH₃ | OH | 202–205 |
| 50 | 3-CH₃SO₂—C₆H₄— | CH₃ | OH | 157–162 |
| 51 | J—C₆H₃—Cl | CH₃ | OH | 203–206 |
| 52 | J—C₆H₃—Br | CH₃ | OH | 198–201 |
| 53 | 3,4-Cl₂—C₆H₃— | CH(CH₃)₂ | OH | 180–183 |
| 54 | Same as above | CH₃ | —N⁺(CH₃)₃Cl⁻ | 179–182 |
| 55 | do | CH₃ | —N(CH₃)(CH₂CN) | 89–91 |
| 56 | do | CH₃ | —OCO—C₆H₅ | 172–174 |
| 57 | do | CH₃ | —OCOSCH(CH₃)₂ | 146–148 |
| 58 | do | CH₃ | —N(C₂H₅)₂ | 80–82 |
| 59 | do | CH₃ | —N(CH(CH₃)₂)₂ | 146–149 |
| 60 | do | CH₃ | —NH—CH₂—CH=CH₂ | 83–85 |
| 61 | do | CH₃ | —NH—CH₃ | 128–130 |

The new 1-phenyl-2,5-dioxo-imidazolidines of the formula I are readily soluble in polar and aprotic organic solvents, for example in lower aliphatic alcohols, such as methanol, in ketones, such as acetone, also in dioxan, dimethyl formamide and cellosolve. They are difficultly soluble in ethyl acetate, benzene and chloroform, and insoluble in water and aliphatic hydrocarbons, such as hexane, petroleum ether etc.

The substitutee phenylureas of the formula III used as starting materials are known compounds. If the selected substitution of the phenyl radical involves using a phenylurea of the general formula II which is not described in the literature, it can be easily manufactured in known manner.

The new active substances of the formula I possess excellent herbicidal properties and are particularly suitable for combating grass-like and broad-leaved weeds in cultures of crop plants, in particular as pre-emergence herbicides in cotton plantations. The active substance of the formula I sucessfully damage or destroy one or more years old deep-rooted weeds which are difficult to combat. Thus field weeds such, for example, as panic grass species (*Setaria* sp.), mustard species (*Sinapis* sp.), goose-foot species (*Chenopodiaceae*), foxtail grass (*Alopecurus* sp.) and other foxtail species, for example *Amaranthus* sp.: grasses, for example *Lolium* sp., compositae, for example *Taraxacum* sp., camomile species (*Matricaria* sp.), are destroyed or retarded in their growth without damage to useful plants, such as cotton, maize, cereals, sorghum etc. In addition, varieties of weeds which are difficult to combat in rice cultures are attacked and destroyed by these active substances: for example, *Echinochloa* sp. in water rice plantations.

The rates of application vary and are dependent on the time of application. They are between 0.1 to 10 kg of active substance per hectare; in the case of application before emergence of the plants up to 4 kg of active substance per hectare, and after emergence of the plants 3 to 10 kg of active substance per hectare, are used. To totally destroy the entire crop of weeds, for example on fallow land neighbouring on the cultivated areas, it is necessary to use more than 10 kg of active substance per hectare. The crop rotation may be carried out on application of the new active substances without any detrimental effects.

The herbicidal action of the active substances according to the invention was established by means of the following test:

Herbicidal Action of the Active Substances on Pre-Emergence Application

Immediately after the test plants have been sown, the active substances, in the form of an aqueous suspension (obtained from a 25 percent wettable powder), are applied to the surface of the soil. The seed dishes are then kept at 22°–23°C and 50–70 percent relative humidity. The test is evaluated after 28 days.

The test plants used were:
Weeds:
  Poa trivialis
  Lolium multiflorum
  Alopecurus myosuorides
  Digitaria sanguin.
  Echinochloa crus galli
  Setaria italica
  Amarantus spez.
  Chrysanthemum segetum
  Sinapis alba
  Ipomoea purpurea
  Pastinaca sativa
Crops plants:
  wheat (*Triticum vulgare*)
  cotton (*Gossypium herbaccara*)
  sorghum (*Sorghum hybridum*)
  maize (*Zea maye*)

The respective rates of application in this test are listed in the following Table.

The evaluation is according to the following key:

| | | |
|---|---|---|
| 9 | = | plants undamaged (control) |
| 1 | = | plants died off |
| 8–2 | = | intermediate stages of damage |
| — | = | not tested |

| Cpd. No. | Rate kg AS/ha | Cotton | Maize | Sorghum | Wheat | Poa trivialis | Lolium multiflorum | Alopecurus myosuorides | Digitaria sanguin. | Echinochloa crus galli | Setaria italica | Amaranthus spez. | Chrysanthemum segetun | Sinapis alba | Ipomoea purpurea | Pastinaca sativa |
|---|---|---|---|---|---|---|---|---|---|---|---|---|---|---|---|---|
| 2 | 1 | – | 9 | 8 | 9 | 1 | 3 | – | – | 3 | – | 1 | 2 | 3 | 2 | – |
|   | 2 | 9 | 9 | 7 | 9 | 1 | 3 | – | – | 3 | – | 1 | 1 | 1 | 1 | – |
|   | 4 | 9 | – | – | – | 1 | 2 | – | – | 1 | – | 1 | 1 | 1 | 1 | – |
| 3 | 1 | – | 9 | 7 | – | 1 | 2 | 3 | 2 | 3 | – | 1 | 1 | – | – | – |
|   | 2 | 9 | 9 | 7 | – | 1 | 2 | 3 | 1 | 2 | – | 1 | 1 | 3 | 2 | 3 |
|   | 4 | 9 | – | – | – | 1 | 1 | 1 | 1 | 1 | – | 1 | 1 | 2 | 1 | 1 |
| 4 | 1 | 9 | 9 | 9 | 8 | 1 | 3 | 3 | 3 | 1 | – | 1 | 1 | – | 3 | – |
|   | 2 | 9 | 8 | 9 | 7 | 1 | 2 | 3 | 3 | 1 | – | 1 | 1 | – | 2 | – |
|   | 4 | 9 | 8 | 7 | – | 1 | 2 | 1 | 1 | 1 | – | 1 | 1 | – | 2 | – |
| 5 | 0.5 | – | 7 | 8 | – | 1 | 3 | 2 | 3 | 1 | 2 | 1 | 1 | 1 | 1 | 2 |
|   | 2 | 7 | 7 | 7 | – | 1 | 2 | 1 | 1 | 1 | 1 | 1 | 1 | 1 | 1 | 1 |
|   | 4 | 7 | – | – | – | 1 | 1 | 1 | 1 | 1 | 1 | 1 | 1 | 1 | 1 | 1 |
| 6 | 0.5 | – | 7 | 9 | – | 1 | – | 2 | 1 | 1 | 1 | 1 | 1 | 3 | 3 | 1 |
|   | 2 | 8 | 7 | 8 | – | 1 | – | 2 | 1 | 1 | 1 | 1 | 1 | 1 | 1 | 1 |
|   | 4 | 8 | – | – | – | 1 | – | 1 | 1 | 1 | 1 | 1 | 1 | 1 | 1 | 1 |
| 7 | 0.5 | – | 8 | – | 8 | 1 | 2 | – | 1 | 1 | 1 | 1 | 1 | 3 | 3 | – |
|   | 2 | 9 | 7 | – | 7 | 1 | 2 | 2 | 1 | 1 | 1 | 1 | 1 | 2 | 3 | 1 |
|   | 4 | 9 | – | – | – | 1 | 1 | 1 | 1 | 1 | 1 | 1 | 1 | 1 | 1 | 1 |
| 23 | 2 | 8 | 8 | 7 | 7 | 1 | 3 | 3 | 3 | 3 | – | 1 | 1 | 1 | 3 | – |
|   | 4 | 8 | – | – | – | 1 | 1 | 2 | 2 | 2 | – | 1 | 1 | 1 | 2 | – |
| 25 | 1 | – | – | – | 9 | 1 | 3 | 3 | 1 | 3 | 3 | 1 | 1 | 1 | 2 | 3 |
|   | 2 | 9 | – | – | 8 | 1 | 2 | 2 | 2 | 2 | 2 | 1 | 1 | 1 | 1 | 3 |
|   | 4 | 8 | – | – | – | 1 | 1 | 1 | 1 | 1 | 1 | 1 | 1 | 1 | 1 | 2 |

Table —Continued

| Cpd. No. | Rate kg AS/ha | Cotton | Maize | Sorghum | Wheat | Poa trivialis | Lolium multiflorum | Alopecurus myosuroides | Digitaria sanguin. | Echinochloa crus galli | Setaria italica | Amaranthus spez. | Chrysanthemum segetun | Sinapis alba | Ipomoea purpurea | Pastinaca sativa |
|---|---|---|---|---|---|---|---|---|---|---|---|---|---|---|---|---|
| 26 | 1 | – | 9 | – | 8 | 1 | 3 | 3 | 3 | – | – | 1 | 1 | 1 | 3 | 3 |
|    | 2 | 9 | 7 | – | 8 | 1 | 1 | 3 | 3 | 3 | 3 | 1 | 1 | 1 | 1 | 3 |
|    | 4 | 8 | – | – | – | 1 | 1 | 2 | 2 | 2 | 1 | 1 | 1 | 1 | 1 | 1 |
| 8  | 1 | 8 | 8 | 7 | 9 | – | – | – | 2 | 4 | 4 | 2 | 1 | 3 | 4 | 4 |
|    | 2 | 7 | 7 | 5 | 8 | 3 | 4 | 3 | 2 | 1 | 2 | 1 | 1 | 3 | 4 | 2 |
| 15 | 0.5 | 9 | – | 7 | 7 | 1 | – | 3 | 2 | 2 | – | 1 | 1 | 2 | 1 | – |
|    | 1 | 9 | – | – | – | 1 | 3 | 2 | 1 | 1 | 3 | 1 | 1 | 1 | 1 | 2 |
|    | 2 | 8 | – | – | – | 1 | 2 | 1 | 1 | 1 | 2 | 1 | 1 | 1 | 1 | 1 |
| 16 | 0.5 | 8 | 7 | – | 8 | 3 | – | – | 2 | 3 | 2 | 1 | 1 | 2 | 2 | – |
|    | 1 | 7 | 7 | – | 7 | 1 | 4 | 3 | 2 | 3 | 2 | 1 | 1 | 1 | 1 | – |
|    | 2 | 7 | – | – | – | 1 | 2 | 2 | 1 | 2 | 1 | 1 | 1 | 1 | 1 | 3 |
| 27 | 1 | 9 | 8 | 9 | 6 | 2 | 4 | – | 2 | – | 1 | 1 | 1 | – | – | – |
|    | 2 | 9 | 7 | 9 | – | 1 | 2 | 1 | 1 | 1 | 1 | 1 | 1 | 1 | – | – |
| 28 | 1 | 9 | 8 | 9 | 8 | 2 | – | – | 2 | 1 | 3 | 1 | 1 | – | 4 | – |
|    | 2 | 9 | – | 8 | – | 1 | 3 | 3 | 1 | 1 | 1 | 1 | 1 | 3 | 3 | – |
|    | 4 | 9 | – | 8 | – | 1 | 2 | 2 | 1 | 1 | 1 | 1 | 1 | 1 | 2 | – |
| 29 | 1 | 9 | 8 | 9 | 7 | 2 | – | 4 | 1 | 2 | 3 | 1 | 1 | – | – | – |
|    | 2 | 9 | 7 | 9 | – | 1 | – | 3 | 1 | 1 | 1 | 1 | 1 | – | – | – |
|    | 4 | 9 | 6 | 7 | – | 1 | 2 | 1 | 1 | 1 | 1 | 1 | 1 | 1 | 2 | 2 |
| 38 | 1 | 9 | 8 | 9 | 9 | 2 | – | 3 | – | 2 | – | 1 | 1 | – | – | – |
|    | 2 | 9 | 8 | 9 | 9 | 2 | 3 | 2 | 2 | 1 | 2 | 1 | 1 | – | – | – |
|    | 4 | 9 | 7 | – | 8 | 1 | 2 | 2 | 1 | 1 | 2 | 1 | 1 | – | – | – |
| 46 | 1 | 8 | 9 | 7 | 8 | – | – | 3 | 1 | 1 | 1 | 1 | 1 | – | – | – |
|    | 2 | 8 | 8 | 7 | 7 | – | – | 2 | 1 | 1 | 1 | 1 | 1 | 1 | 2 | – |
|    | 4 | 8 | 7 | 7 | – | – | 1 | 2 | 1 | 1 | 1 | 1 | 1 | 1 | 2 | 2 |
| 47 | 1 | 9 | 8 | 7 | 7 | – | – | – | 2 | 1 | 3 | 1 | 1 | 1 | 3 | – |
|    | 2 | 8 | – | – | – | – | 2 | – | 2 | 1 | 2 | 1 | 1 | 1 | 2 | – |
|    | 4 | 8 | – | – | – | – | 1 | 3 | 1 | 1 | 1 | 1 | 1 | 1 | 1 | 1 |

Herbicidal action on pre-emergence application of active substance No. 4 in rice with which weeds have been sown The aqueous dispersion of active substance No. 4 is applied to the surface of the soil in the test vessels and worked in to a depth of about 1 cm. The rice test plants (Oryza oryzoides) and Echinochloa crus galli are sown and the soil is completely saturated with water. After the seeds have emerged, the water level in the vessels is raised to about 2–3 cm above the surface of the soil.

The tests are carried out in a greenhouse at 24°–27°C and 70 percent relative humidity. The evaluation of the tests takes place after 28 days and according to the following key:

```
9   = plants undamaged (control)
1   = plants died off
8-2 = intermediate stages of damage.
```

| Rate of application in kg of active substance/ha | Rice | Echinochloa crus galli |
|---|---|---|
| 0.5 | 9 | 1 |
| 1   | 9 | 1 |
| 2   | 9 | 1 |

The herbicidal agents according to the invention are manufactured in known manner by intimately mixing and/or grinding active substances of the formula I with the suitable carriers, optionally with the addition of dispersants or solvents which are inert towards the active substances. The active substances may be available and can be used in the following forms:

Solid forms
   dusts, tracking agents, granules, coated granules, impregnated granules and homogeneous granules.

Liquid forms
   a. active substances which are dispersible in water: wettable powders, pastes, emulsions;
   b. solutions.

To manufacture solid forms (dusts, tracking agents), the active substances are mixed with solid carriers. Suitable carriers are, for example: kaolin, talcum, bolus, loess, chalk, limestone, ground limestone, attaclay, dolomite, diatomaceous earth, precipitated silica, alkaline earth silicates, sodium and potassium aluminum silicates (feldspar and mica), calcium and magnesium sulphates, magnesium oxide, ground synthetic materials, fertilisers, for example ammonium sulphate, ammonium phosphate, ammonium nitrate, urea, ground vegetable products, such as corn meal, bark dust, sawdust, nutshell meal, cellulose powder, residues of plant extractions, activated charcoal etc. These substances can either be used alone or in admixture with one another.

The particle size of the carriers for dusts is advantageously up to about 0.1 mm, for tracking agents about 0.075 to 0.2 mm, and for granules 0.2 mm or larger.

The concentrations of active substance in the solid preparations are usually from 0.5 to 80 percent.

To these mixtures can also be added additives which stabilize the active substance and/or non-ionic, anionic and cationic surface active substances, which for example improve the adhesion of the active ingredients on plants or parts of plants (adhesives and agglutinants) and/or ensure a better wettability (wetting agents) and dispersibility (dispersing agents). Examples of suitable adhesives are the following: olein/chalk mixture, cellulose derivatives (methyl cellulose, carboxymethyl cellulose), hydroxyethyl glycol ethers of monoalkyl and dialkyl phenols having 5 to 15 ethylene oxide radicals per molecule and eight to nine carbon atoms in the alkyl radical, lignin sulfonic acids, their alkali metal and alkaline earth metal salts, polyethylene glycol ethers (carbowaxes), fatty alcohol polyethylene glycol ethers having 5 to 20 ethylene oxide radicals per molecule and eight to 18 carbon atoms in the fatty alcohol moiety, condensation products of ethylene oxide/propylene oxide, polyvinyl pyrrolidones, polyvinyl alcohols, condensation products of urea and formaldehyde, and also latex products.

The water-dispersible concentrates of the active substance, i.e., wettable powders, pastes and emulsifiable concentrates, are agents which can be diluted with water to any concentration desired. They consist of active substance, carrier, optionally additives which stabilize the active substance, surface-active substances and anti-foam agents and, optionally solvents. The concentration of active substance in these agents is 5–80 percent.

Wettable powders and pastes are obtained by mixing and grinding the active substances with dispersing agents and pulverulent carriers in suitable apparatus until homogeneity is attained. Carriers are, for example, those mentioned for the solid forms of application. In many cases it is advantageous to use mixtures of different carriers. As dispersing agents there can be used, for example, condensation products of sulfonated naphthalene and sulfonated naphthalene derivatives with formaldehyde, condensation products of naphthalene or naphthalene sulfonic acids with phenol and formaldehyde, as well as alkali, ammonium and alkaline earth metal salts of lignin sulfonic acid, in addition, alkylaryl sulfonates, alkali and alkaline earth metal salts of dibutyl naphthalene sulfonic acid, fatty alcohol sulfates such as salts of sulfated hexadecanols, heptadecanols, octadecanols, and salts of sulfated fatty alcohol glycol ethers, the sodium salt of oleoyl ethionate, the sodium salt of oleoyl methyl tauride, ditertiary acetylene glycols, dialkyl dilauryl ammonium chloride and fatty acid alkali and alkaline earth metal salts.

Suitable anti-foam agents are silicones.

The active substances are so mixed, ground, sieved and strained with the additives mentioned above that, in wettable powders, the solid particle size of from 0.02 to 0.04 and in pastes, of 0.03 is not exceeded. To produce emulsifiable concentrates and pastes, dispersing agents such as those given in the previous paragraphs, organic solvents and water are used. Examples of suitable solvents are the following: alcohols, benzene, xylenes, toluene, dimethyl sulfoxide, and mineral oil fractions boiling between 120° and 350°C. The solvents must be practically odorless, not phytotoxic, inert to the active substances and not readily inflammable.

Furthermore, the agents according to the invention can be applied in the form of solutions. For this purpose the active substance or several active substances of general formula I are dissolved in suitable organic solvents, mixtures of solvents or in water. Aliphatic and aromatic hydrocarbons, chlorinated derivatives thereof, alkyl naphthalenes, and mineral oils alone or mixed with each other, can be used as organic solvents. The solutions should contain the active substances in a concentration of from 1 to 20 percent.

The agents described according to the invention may be mixed with other biocidally active compounds or agents. Thus to broaden the activity spectrum the new agents may contain, for example, insecticides, fungicides, bactericides, fungistatics, bacteriostatics or nematocides, in addition to the cited compounds of the formula I. The agents according to the invention may also contain plant fertilisers, trace elements etc.

Preparations forms of the new imidazolidines are described hereinbelow. Parts denote parts by weight.

Granules

The following substances are used to manufacture 5 percent granules:

5 parts of 1-(p-chlorophenyl)-3-methyl-4-hydroxy-2,5-dioxo-imidazolidine,
0.25 parts of epichlorohydrin,
0.25 parts of cetyl polyglycol ether,
3.50 parts of polyethylene glycol ether,
91 parts of kaolin (particle size: 0.3-0.8 mm).

The active substance is mixed with epichlorohydrin and the mixture dissolved in 6 parts of acetone, then polyethylene glycol ether and cetyl polyglycol ether are added. The resulting solution is sprayed on kaolin and then evaporated in vacuo.

Wattable Powder

The following constituents are used to manufacture (a) a 50 percent, (b) a 25 percent and (c) a 10 percent wettable powder:

a. 50 parts of 1-(3'-chloro-4'-methyl-phenyl)-3-methyl-4-hydroxy-2,5-dioxo-imidazolidine, 5 parts of sodium dibutylnaphthalene sulphonate, 3 parts of napthalenesulphonic acid/phenolsulphonic acid/formaldehyde condensate (3:2:1), 20 parts of kaolin, 22 parts of Champagne chalk;

b. 25 parts of 1-phenyl-3-methyl-4-chloro-2,5-dioxo-imidazolidine, 5 parts of sodium oleylmethyltauride, 2.5 parts of naphthalenesulphonic acid/formaldehyde condensate, 0.5 parts of carboxymethyl cellulose, 5 parts of neutral potassium aluminium silicate, 62 parts of kaolin;

c. 10 parts of 1-(3'-methyl-4'-bromophenyl)-3-methyl-4-hydroxy-2,5-dioxo-imidazolidine, 3 parts of a mixture of the sodium salts of saturated fatty alcohol sulphates, 5 parts of naphthalenesulphonic acid/formaldehyde condensate, 82 parts of kaolin.

The indicated active substance is applied to the corresponding carriers (kaolin and chalk) and then these are mixed and ground, to yield wettable powders of excellent wettability and having an excellent capacity for forming suspensions. By diluting these wettable powders with water it is possible to obtain suspensions of every desired concentration of active substance. Such suspensions are used for combating weeds and weed-like grasses in cultures of crop plants.

Paste

The following substances are used to manufacture a 45 percent paste:

45 parts of 1-(3',4'-dichlorophenyl)-3-methyl-4-methyl-carbamoyloxy)-2,5-dioxo-imidazolidine,
5 parts of sodium aluminium silicate, 14 parts of cetyl polyglycol ether with 8 mols of ethylene oxide,
1 parts of oleyl polyglycol ether with 5 mols of ethylene oxide,
2 parts of spindle oil,
10 parts of polyethylene glycol,
23 parts of water.

The active substance is intimately mixed with the additives in appropriate devices and ground. A paste is obtained from which, by diluting it with water, it is possible to manufacture suspensions of every desired concentration of active substance. The suspensions are suitable for treating vegetable cultures.

Emulsion Concentrate 25 parts of 1-(3',4'-dichlorophenyl)-3-methyl-4-chloroacetoxy-2,5-dioxo-imidazolidine,
5 parts of a mixture of nonylphenolpolyethylene and calcium-dodecyhlbenzene-sulphonate,
35 parts of 3,5,5-trimethyl-2-cyclohexen-1-one,
35 parts of dimethyl formamide
are mixed together. This concentrate can be diluted with water to give emulsions in desired concentrations. Such emulsions are suitable, for example, for combating weeds in crop plant cultures, such as cotton, maize etc.

What we claim is:
1. A substituted 1-phenyl-2,5-dioxo-imidazolidine of the formula I

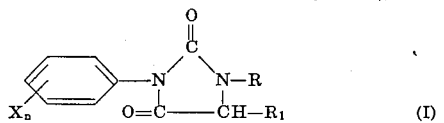 (I)

wherein X represents a halogen atom, the cyano group, a $C_1$–$C_6$ alkyl or $C_1$–$C_3$ alkoxy radical, a $C_3$ alkenyloxy, $C_3$ alkinyloxy or $C_3$ alkenylthio radical, the phenoxy radical, the trifluoromethyl group, an optionally chlorinated methylsulphonyl radical or a dialkylsulphamoyl radical having $C_1$–$C_6$ alkyl groups, $n$ represents 0 or an integer from 1 to 3, R represents a lower alkyl radical, $R_1$ represents halogen, the cyano group, the group -NCS, the amino group, a $C_1$–$C_6$ alkylamino, $C_3$ alkenylamino, dialkylamino or cyanoalkylamino radical having $C_1$–$C_6$ alkyl groups, or guanidyl group, also a urea radical of the formula

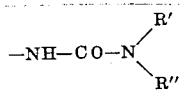

wherein R' and R" each represents hydrogen, $C_1$–$C_6$ alkyl, or phenyl, $R_1$ also represents a radical -OR''', in which R''' represents hydrogen, the cyano group, a cyanoalkyl radical having $C_1$–$C_6$ alkyl groups or the group —COZ, in which Z stands for alkylamino, dialkylamino, or alkyl radicals with 1–6 carbon atoms in the alkyl group, halogenomethyl, phenyl, or $C_1$–$C_6$ alkylthio, and finally, $R_1$ also represents a group of the formula

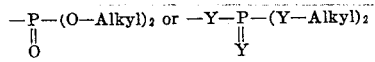

wherein each alkyl group contains from 1–6 carbon atoms, and in which each Y represents independently oxygen or sulphur and the alkyl radical may also be halogenated, and mineral acid salts thereof also those which can be obtained by quaternising a substituted amino group.

2. 1-Phenyl-2,5-dioxo-imidazolidines according to claim 1, wherein X represents a fluorine, chlorine, bromine or iodine atom, the cyano group, an alkyl or alkoxy radical each containing from one to three carbon atoms, the trifluoromethyl, a methylsulphonyl or a dimethylsulphamoyl radical, $n$ is 0 or an integer from 1 to 3, R represents the methyl group, and $R_1$ represents a chlorine atom, the hydroxyl group, the amino group, or an alkylamino, alkenylamino, dialkylamino, alkylcarbamoyloxy or dialkylcarbamoyloxy group containing at most three carbon atoms in the respective alkyl radicals, or an optionally chlorinated acetoxy radical or an O,O-bis(alkyl)dithiophosphoryl group containing in each case at most 4 carbon atoms in the aliphatic chain.

3. 1-Phenyl-2,5-dioxo-imidazolidine according to claim 2, wherein X represents a fluorine, chlorine, bromine or iodine atom, the cyano group, the methyl, methoxy, trifluoromethyl, methylsulphonyl or dimethylsulphamoyl radical.

4. 1-Phenyl-2,5-dioxo-imidazolidines according to claim 2, wherein X represents a fluorine, chlorine, bromine or iodine atom, the cyano group, the methyl, methoxy, trifluoromethyl, methylsulphonyl or dimethylsulphamoyl radical, $n$ is 0 or an integer from 1 to 3, R represents the methyl group, and $R_1$ represents a chlorine atom, the hydroxyl, amino, alkyl amino or a dialkylamino group, containing at most three carbon atoms in the alkyl radicals, the methylcarbamoyloxy, dimethylcarbamoyloxy, acetoxy, chloroacetoxy group or an O,O-bis(alkyl)dithiophosphoryl group, in which each of the two alkyl radicals independently represents methyl, ethyl, propyl or isopropyl.

5. 1-(p-bromo-m-tolyl)-2,5-dioxo-3-methyl-4-hydroxy-imidazolidine according to claim 1.

6. 1-(p-chlorophenyl)-2,5-dioxo-3-methyl-4-hydroxy-imidazolidine according to claim 1.

7. 1-(p-bromophenyl)-2,5-dioxo-3-methyl-4-hydroxy-imidazolidine according to claim 1.

8. 1-(m,p-dichlorophenyl)-2,5-dioxo-3-methyl-4-hydroxyimidazolidine according to claim 1.

9. 1-(m-bromophenyl)-2,5-dioxo-3-methyl-4-hydroxy-imidazolidine according to claim 1.

10. 1-(m-fluorophenyl)-2,5-dioxo-3-methyl-4-hydroxy-imidazolidine according to claim 1.

11. 1-(p-fluorophenyl)-2,5-dioxo-3-methyl-4-hydroxyimidazolidine according to claim 1.

12. 1-(m,p-dichlorophenyl)-2,5-dioxo-3-methyl-4-methylcarbamoyloxy-imidazolidine according to claim 1.

13. 1-(m,p-dichlorophenyl)-2,5-dioxo-3-methyl-4-dimethylcarbamoyloxy-imidazolidine according to claim 1.

14. 1-(m,p-dichlorophenyl)-2,5-dioxo-3-methyl-4-monochloroacetoxy -imidazolidine according to claim 1.

15. 1-(m,p-dichlorophenyl)-2,5-dioxo-3-methyl-4-chloroimidazolidine according to claim 1.

16. 1-(m,p-dichlorophenyl)-2,5-dioxo-3-methyl-4-[O,O-bis (methyl)-dithiophosphoryl]-imidazolidine according to claim 1.

17. 1-(m,p-dichlorophenyl)-2,5-dioxo-3-methyl-4-amino-imidazolidine according to claim 1.

18. 1-(m,p-dichlorophenyl)-2,5-dioxo-3-methyl-4-dimethyl-amino-imidazolidine according to claim 1.

19. [1-(m,p-dichlorophenyl)-2,5-dioxo-3-methyl-imidazolidinyl (4)]-trimethylammonium chloride according to claim 1.

20. 1-(m,p-dichlorophenyl)-2,5-dioxo-3-methyl-4-(N'-methyl-N'-cyanomethylamino)-imidazolidine according to claim 1.

* * * * *